United States Patent
Gardos et al.

(10) Patent No.: US 7,069,323 B2
(45) Date of Patent: *Jun. 27, 2006

(54) DOMAIN MANAGER AND METHOD OF USE

(75) Inventors: Robert D. Gardos, New York, NY (US); Adam D. Burstein, Brooklyn, NY (US); Shamoun Murtza, Hackensack, NJ (US); Chia Hsian Yeh, Flushing, NY (US); Rong Zheng, Brooklyn, NY (US)

(73) Assignee: Register.com, Inc., NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/047,112

(22) Filed: Jan. 31, 2005

(65) Prior Publication Data

US 2005/0144323 A1    Jun. 30, 2005

Related U.S. Application Data

(63) Continuation of application No. 09/560,433, filed on Apr. 27, 2000, now Pat. No. 6,880,007.

(60) Provisional application No. 60/137,908, filed on Jun. 7, 1999.

(51) Int. Cl.
*G06F 15/16* (2006.01)

(52) U.S. Cl. ............... 709/225; 709/220; 709/227; 713/201; 707/201

(58) Field of Classification Search ........... 709/203, 709/223, 225, 227, 228, 220, 221, 246; 713/201, 713/203; 707/3, 201
See application file for complete search history.

(56) References Cited

U.S. PATENT DOCUMENTS

| | | | |
|---|---|---|---|
| 5,958,052 A | 9/1999 | Bellovin et al. | |
| 6,085,188 A | 7/2000 | Bachmann et al. | |
| 6,182,148 B1 | 1/2001 | Tout | |
| 6,298,341 B1 | 10/2001 | Mann et al. | |
| 6,311,214 B1 | 10/2001 | Rhoads | |
| 6,338,082 B1 * | 1/2002 | Schneider | 709/203 |
| 6,425,003 B1 * | 7/2002 | Herzog et al. | 709/223 |
| 6,895,430 B1 * | 5/2005 | Schneider | 709/217 |
| 6,895,431 B1 * | 5/2005 | Bero | 709/220 |

* cited by examiner

*Primary Examiner*—Khanh Dinh

(74) *Attorney, Agent, or Firm*—Hogan & Hartson L.L.P.

(57) ABSTRACT

A program running on a web server allows automated domain name registration, modification and management through an interface running on a client machine. The program redefines the concept of the Domain Name System zones by breaking them down into discrete records that can be managed in a database. The structuring of domain records in such a way allows global modifications to a given record type for all domains owned by a given domain name Registrant. Further, when run on the web server of an accredited registrar, the program enables domain name Registrants an easy and efficient way to reliably monitor and manage their domain name property.

13 Claims, 8 Drawing Sheets

FIG.5

DOMAIN MANAGER

CHANGE IP | DOMAIN ALIAS | CHANGE MX | SOA | FIRSTSTEPSITE

MODIFY DNS | CONTACT INFO | BILLING | REGISTER DOMAIN | QUESTIONS

– CONTACT INFO –

ADMINISTRATIVE CONTACT
THIS IS THE PERSON WHO IS CONTACTED REGARDING ANY DECISIONS WITH RESPECT TO THE DOMAIN NAME.

ORGANIZATIONAL CONTACT
THIS IS THE ORGANIZATION OR GROUP THAT IS ASSOCIATED WITH THE REGISTERED DOMAIN NAME.

TECHNICAL CONTACT
THIS IS THE PERSON WHO HANDLES THE TECHNICAL ASPECTS OF YOUR DOMAIN, SUCH AS HOSTING YOUR WEB SITE, AS WELL AS MAKING DECISIONS REGARDING IP ADDRESSES, ALIASES, MX RECORDS AND AUTHORITATIVE NAME SERVERS FOR THE DOMAIN NAME.

ZONE CONTACT
THIS CONTACT IS TYPICALLY THE SAME INDIVIDUAL AS THE TECHNICAL CONTACT.

BILLING CONTACT
THIS IS THE PERSON WHO IS RESPONSIBLE FOR INITIAL AND RECURRING BILLING FOR THE DOMAIN NAME. KEEP IN MIND THAT IT IS VERY IMPORTANT TO KEEP YOUR BILLING INFORMATION UP TO DATE.

NAME: LEWY
DOMAIN: JOELEWY.COM
EXPIRES: SAT, AUG 18, 2001

DOMAIN NAME (TOTAL: 1)
JOELEWY.COM

SPECIFIC DOMAIN SEARCH: [      ] GO register™ .com

HELP
MANAGE MY DOMAIN
BUSINESS RESOURCES
CORPORATE SERVICES
TRANSFERS/CHANGES
WEB HOSTING
URL FORWARDING
EMAIL BY USA.NET ®
CONTACT US

DOMAIN MANAGER

CHANGE IP | DOMAIN ALIAS | CHANGE MX | SOA | FIRSTSTEPSITE

MODIFY DNS | CONTACT INFO | BILLING | REGISTER DOMAIN | QUESTIONS

PLEASE CLICK HERE TO CONTINUE TO EDIT YOUR DOMAIN NAME.

NAME: LEWY
DOMAIN: JOELEWY.COM
EXPIRES: SAT, AUG 18, 2001

DOMAIN NAME (TOTAL: 1)

JOELEWY.COM

DNS (DOMAIN NAME SERVER) QUESTIONS
LEARN ABOUT NAME SERVERS, AND GET HELP ON EDITING, ADDING, AND DELETING DOMAIN NAMES.

CONTACT INFORMATION QUESTIONS
GET HELP ON HOW TO MODIFY YOUR CONTACT INFORMATION ASSOCIATED WITH YOUR DOMAIN NAME.

BILLING INFORMATION QUESTIONS
GET HELP ON HOW TO MODIFY YOUR BILLING INFORMATION ASSOCIATED WITH YOUR DOMAIN NAME.

IP ADDRESS (A RECORD) QUESTIONS
GET HELP ON MODIFYING THE IP ADDRESSES TO WHICH YOUR DOMAIN NAME RESOLVES.

DOMAIN ALIAS (C NAME) QUESTIONS
GET HELP ON CREATING AND MODIFYING THE DOMAIN ALIASES ASSOCIATED WITH YOUR DOMAIN NAME (FOR EXAMPLE: SHOP.MYBRAND.COM)

SOA (START OF AUTHORITY) QUESTIONS

SPECIFIC DOMAIN SEARCH: [ ] GO register™.com

HELP
MANAGE MY DOMAIN
BUSINESS RESOURCES
CORPORATE SERVICES
TRANSFERS/CHANGES
WEB HOSTING
URL FORWARDING
EMAIL BY USA.NET®
CONTACT US

DOMAIN MANAGER AND METHOD OF USE

PRIORITY NOTICE

This application is a continuation of application Ser. No. 09/560,433, filed Apr. 27, 2000 now U.S. Pat. No. 6,880,007, which claims priority from U.S. provisional patent application Ser. No. 60/137,908, filed Jun. 7, 1999, which applications are hereby incorporated by reference in their entirety.

COPYRIGHT NOTICE

A portion of the disclosure of this patent document contains material subject to copyright protection. The copyright owner has no objection to the facsimile reproduction by anyone of the patent document or patent disclosure, as it appears in the U.S. Patent and Trademark Office patent file or records, but otherwise reserves all copyrights whatsoever.

BACKGROUND OF THE INVENTION

1. Field of the Invention

The present invention relates generally to the Internet and more specifically to a method of managing Internet addressing, such as registration and modification of domain names, addresses and their associated records.

2. Description of the Related Art

Each computer on the Internet is identified by a unique Internet protocol ("IP") address. This address is a 32-bit number organized as four 8-bit values separated by periods such as 123.45.67.89. Such a numerical system, while useful as a routing address system for computer-to-computer communication, is not human user-friendly. Consequently, domain names are used to allow users to more easily identify and connect to a target computer on the network. These user-friendly domain names (or "host names"), such as "register.com", are easy for users to remember and, since they map to a unique IP number, accurately identify the computer's IP address. While initially designed as a user-friendly connection scheme on the Internet, the right to use certain domain names has become an important intellectual property. In some instances, the use of a particular domain name has taken on branding significance.

The domain name entered by a user is sent over the Internet to a global network of servers called the Domain Name System (DNS), which translates the domain name into the target computer's numerical IP address. The numerical IP address is then sent to the user's computer to enable it to connect to the target computer. Typically, after the user enters the domain name, the rest of the process is invisible to the user until the user connects to the target computer.

Domain name space is a distributed hierarchical system organized at its highest level into a number of top-level domains. Each top-level domain ("TLD") is divided into second-level domains, which are in turn divided into third-level domains, etc. There are more than 200 two-letter national, or country code, top-level domains ("cc-TLD") administered by their respective governments or an assigned agent of that respective government. Other top-level domains include those identified by the familiar three letter codes, .com, org, .net, .edu, .gov, .mil and .int, originally introduced in the United States. Some of these three-letter codes, such as .edu, .gov and .mil, are only used in the United States. Others can be used anywhere in the world. In 1991–1992, the National Science Foundation ("NSF") assumed responsibility for managing the non-military portion of these three-letter Internet codes. On Dec. 31, 1992, the National Science Foundation entered into an agreement with Network Solutions, Inc. ("NSI"), under which Network Solutions managed the codes .com, .org, and net, including registering domain names for computers on the Internet using these codes on an interim basis. The three codes managed by Network Solutions have come to be known as generic top-level domains ("g-TLD").

Network Solutions assigned these generic top-level domains to users on a first-come, first-serve basis and also maintained a directory linking domain names with the IP addresses of domain name servers (the "Root Servers" or "DNS root servers"). The Root Servers are each an authoritative database of top-level domain names on the Internet. There are presently thirteen Root Servers worldwide that contain authoritative databases listing all top-level domains. The centralized management of Root Servers for all generic top-level domains assured that each computer on the network could be uniquely identified, and that unique duplicate names and numerical addresses were used. Network Solutions approved host domain names before registration to assure that no other user had already claimed the name. A variety of other related information was also recorded at the time the domain name was registered, such as contact and billing information. This related information was registered in a database, the Registry Whois, also administered by Network Solutions.

The conventional way for a domain name registrant or the registrant's designated agent (collectively, "Registrant") to manage a domain name and its associated records is to enter the name via e-mail to the Registry Whois along with the contact information, the billing information, the expiration date, etc., for that domain name. If a change is to be made to a domain name record, the Registrant submits an e-mail form identifying the nature of the change. FIG. 1 shows the method conventionally used by Registrants who wished to register a domain name or reliably make changes to a registered domain name or the name's associated records. Under this method, the Registrant connected its client machine 1 over a public network such as the Internet 10 to a gateway server 5 coupled to the DNS Root Server. The Registrant sent a request over the client machine's browser 2 to retrieve an e-mail template 3 from the registration/modification program 6 residing on the gateway server 5. The requested registration/modification template is completed and submitted by the Registrant via e-mail to the gateway server and queued for processing.

If the Registrant wished to initially register a new domain name with a generic top-level domain, the Registrant entered the required information, or domain records, into the e-mail template 3 and sent it over the Internet 10 to the gateway server. The gateway server processed Registrant requests with its e-mail parsing system 7 and sent the requests on to the Registry Whois 8 directory to determine whether the requested name was available. If not, the request was denied and the Registrant was informed through e-mail that the name was not available. If the name was available, the new name, its IP address and the domain record information were accepted and entered into the DNS Root Server 9. The Registry Whois 8 was updated with the new information associated with the new domain name.

Modifications under this system were made similarly. The Registrant requested information on a particular domain name. The information was retrieved from the Registry Whois 8 and was made available on the interface 3 of the client machine 1. The Registrant entered modifications and proper authorization information and the changes were sent to the gateway server. From the gateway server 5, the modifications again went over the e-mail parsing system 7 to the DNS Root Server 9 and the Registry Whois 8 where the modifications were entered. Periodically, the DNS Root Server would update all other DNS root servers 11. This procedure introduced periods when websites appeared to be inoperative or abandoned after the physical Internet presence moved and the domain name was not properly associated with the new address on all DNS root servers.

If the Registrant requested country-code top-level domain name registrations and modifications, they were sent through the e-mail parsing system 7 to the DNS 12 and Whois registry 13 (or equivalent system) for the requested country. These databases interacted with the country-code-specific DNS management system 14 to request changes or enter new domains.

As shown in FIG. 2, the Registrant might have chosen to modify a record through an unaccredited registrar. The term "unaccredited registrar" refers to an organization that does not have the authority to directly register new Registrants or update Registrant records directly on the DNS root server. Unaccredited registrars thus facilitate the transfer or registration of modification information between the Registrant and an accredited registrar. When a Registrant used an unaccredited registrar, the Registrant accessed a domain program 60 residing on the unaccredited registrar's web server 50 to generate the interface 30. The domain program would likely request essentially the same information required by the system of FIG. 1. The Registrant sent modifications over the Internet to the unaccredited registrar's web server 50. The unaccredited registrar passed the information via e-mail 61 to the gateway server 5, and the rest of the process proceeded as described for FIG. 1. Regardless of which registrar initially received the domain record, the information ultimately ended up passing through the gateway server before updating the DNS server or the Registry Whois.

An unaccredited registrar would also likely have a database server 52 for storage of domain records. The database server 52 would be operationally associated with an internal DNS 51, which itself communicated with the rest of the DNS over the Internet 10. In this way, the unaccredited registrar could provide a place for new registrants to "park" a domain name on a server until such time as the registrants found a permanent location.

However, the unaccredited registrar had no way of knowing what records were current for the domain name, because the registrar had to obtain information for the Registrant through the authoritative DNS server via e-mail. Any number of unaccredited registrars or individual Registrants could send e-mail changes to the authoritative DNS server at any given moment. Because of this, information returned in response to a request for domain name availability or status could not be considered reliable, in that it might not accurately represent the current contents of the DNS root servers and the Registry Whois. Certain unaccredited registrars provided a limited ability for Registrants to make changes to certain records for existing domain names, but these changes were similarly not authoritative or reliable.

The domain name registration and management system for generic top-level domain names is changing. The U.S. Department of Commerce has granted the Internet Corporation for Assigned Names and Numbers ("ICANN") the authority to regulate the allocation and use of domain names. ICANN has accredited a number of new domain name registrars ("accredited registrars"), including the assignee of the present invention, to provide generic top-level domain name registration services and indicates that more accreditations are to be made in the future. Accredited registrars are authorized to directly register new Registrants and make changes to Registrants' domain records.

Accredited registrars have access to the Root Servers managed by Network Solutions through a Shared Registration System ("SRS"), which uses secure socket layer ("SSL") encryption to insure security while allowing access to a common database of information. While Network Solutions continues to manage the Registry Whois database, accredited registrars each manage their own Registrar Whois directory, which is authoritative for all domain names registered through that particular accredited registrar. The uniqueness of each domain name will, of course, be maintained as all accredited registrars access the DNS root server through the SRS to register new names and modify existing records. Thus accredited registrars can cause the modification of records in the DNS root server through the application program running on the SRS. The Registry Whois keeps a listing of host domain names and the authoritative registrar for the host name. The Registry Whois is updated only if the accredited registrar is changed or the DNS server having primary authority over the name is changed.

Historically, when Network Solutions was the only accredited registrar, a certain level of Registrant-accessible domain name information control for generic top-level domain names was available from Network Solutions and from certain unaccredited registrars. These services gave Registrants limited control over certain individual domain name records. For instance, Registrants could transfer a name, forward e-mail and manage canonical names or aliases. On the other hand, there was no mechanism that allowed Registrants control over contract profiles, IP addresses, domain aliases, expiration and billing dates and the like. Nor could this system reliably assure Registrants that the records presented and modifications to the records will be consistent with the records in the DNS root servers. These limitations make the management of the information associated with the domain name usage an increasingly difficult, albeit important, task.

Further, presently available domain name record management is via "zone management designed for managing only a single domain name at a time. As used herein, "zone management" is the management of domain aliases, IP addresses, mail exchange (MX) records, and other records associated with a domain name. Zone management is difficult to use to effectively manage many domain names. If the Registrant has twenty different domain names, the same form must be submitted twenty times, once for each domain name. Accordingly, under the conventional system, there is no convenient way to manage the information recorded for a number of domain names or to easily monitor expiration dates and other critical data. This is particularly disadvantageous for businesses and other organizations that commonly have the use of multiple domain names and numerous sub-domains.

SUMMARY OF THE PREFERRED EMBODIMENTS

There is a need for a system to allow an accredited registrar to provide an automated, easy to use domain name management system that allows Registrants to reliably update, modify and monitor all records associated with a domain name registration. There is also a need for a system that allows Registrants holding multiple domain names to more easily globally update the individual records for each domain name when that Registrant modifies a record that is common to multiple domains.

An embodiment of the present invention is a domain manager that is a computer implemented method of administering a plurality of modifiable domain name records in a database in cooperation with a DNS root server that allows Registrants and designated agents of Registrants to update records associated with multiple domain names.

Preferably the method operates in cooperation with a database storing first and second records corresponding to a first domain name and a second domain name, respectively. An exemplary embodiment of the method might accept a command from a Registrant's client machine to modify the first record to a modified record. The method might accept a command from the client machine to apply the modification of the first record to the second record and then store the modified record in place of each of the first and second records in the database. The method might then cause the records in the DNS root server to be substantially in agreement with the database records.

In a particular implementation, the term "substantially in agreement" means that the substantive information, for example contact name, IP address, etc., are brought into agreement once the change has been made on the database and the DNS root server. This concept recognizes that the format of the stored information may be different in different machines.

In another embodiment, this method might be used to modify a first domain record stored in a database in concurrence with a record in a DNS root server. Advantageously, the method could use a computer system that has a memory and a display to generate a graphical user interface (GUI) displaying the domain record related to the database on the display. The embodiment might includes accessing the first domain record in the database and displaying the graphical user interface (GUI) on the display, the GUI having a field in which the first record is displayed. The method displays a modified record in the field in response to a user input and stores the modified record in the database, replaces the first record in the database with the modified record. Most preferably, the method facilitates the replacement of the first record in the DNS root server with the modified record.

The "facilitation" may be accomplished directly by the administrator of the database, where that administrator also authoritatively administers a Root Server, or indirectly through the SRS, where the administrator of the database is an accredited registrar. Designations such as "authoritative" and "accredited", as used herein, refer to the ability to alter certain authoritative records. These designations may in many instances correspond to designations made directly or indirectly by an agency of the national government, for instance, the U.S. government. As an example, an agency such as the Department of Commerce may either directly or indirectly confer such a designation on an entity.

The method discussed above might alternately be embodied in a computer program that performs the method or causes a computer to facilitate the method when the computer program operates on the computer.

BRIEF DESCRIPTION OF THE DRAWINGS

The invention will best be understood from the following description when read in conjunction with the accompanying drawings, which form a part of the present disclosure.

FIG. 5 is a .gif reproduction of a Contact Information screen that might be provided in accordance with an embodiment of the present invention. (Unpublished work. Copyright© 2000 Register.com).

FIG. 6 is a .gif reproduction of a help screen that might be provided in accordance with an embodiment of the present invention. (Unpublished work. Copyright© 2000 Register.com).

FIG. 7 is a .gif reproduction of a Register a Domain Name screen that might be provided in accordance with an embodiment of the present invention. (Unpublished work. Copyright© 2000 Register.com).

DETAILED DESCRIPTION OF THE PREFERRED EMBODIMENTS

Figure 1:
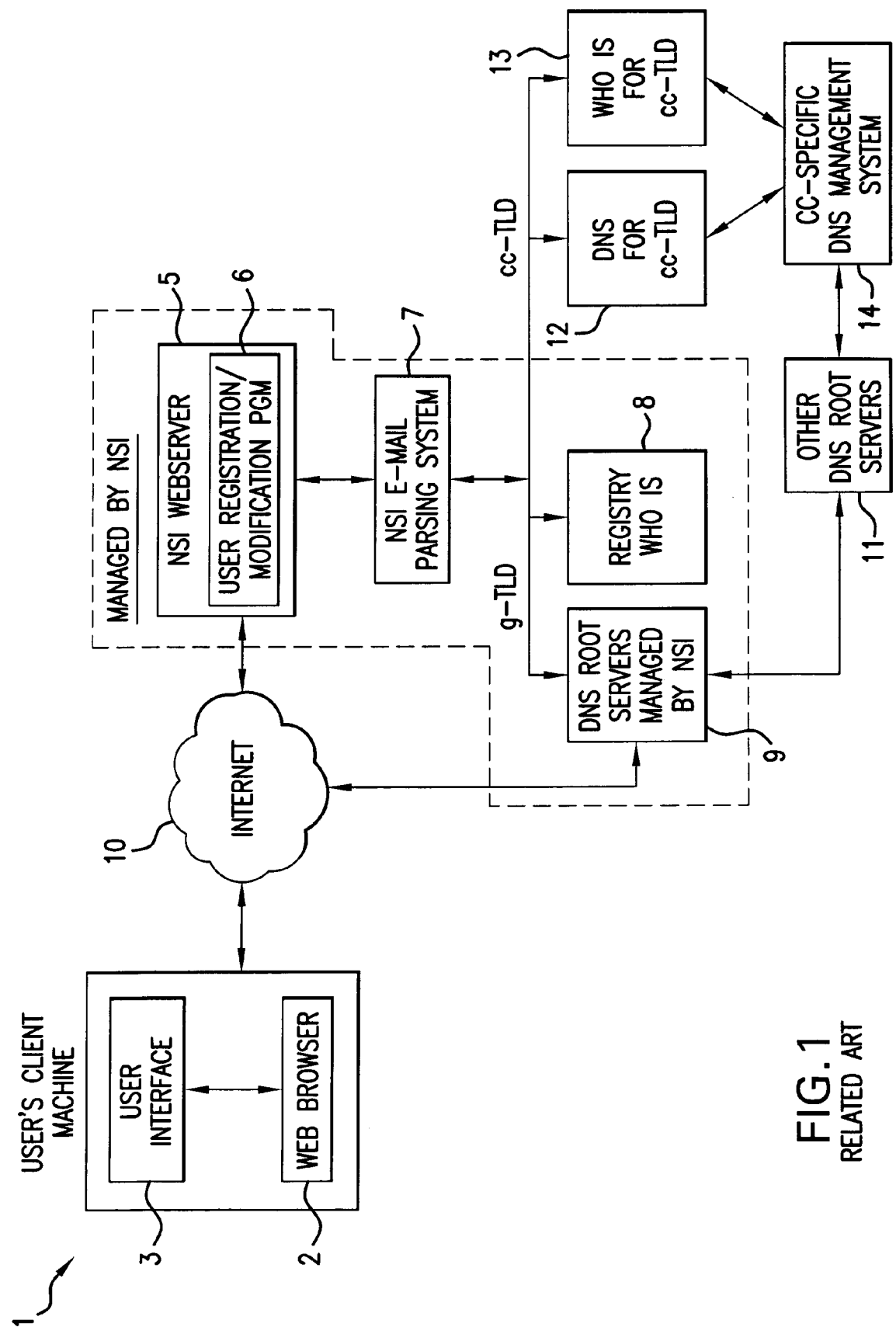
FIG. 1 is a block diagram showing a method of registering or modifying domain records through an accredited registrar under the related art.
Figure 2:
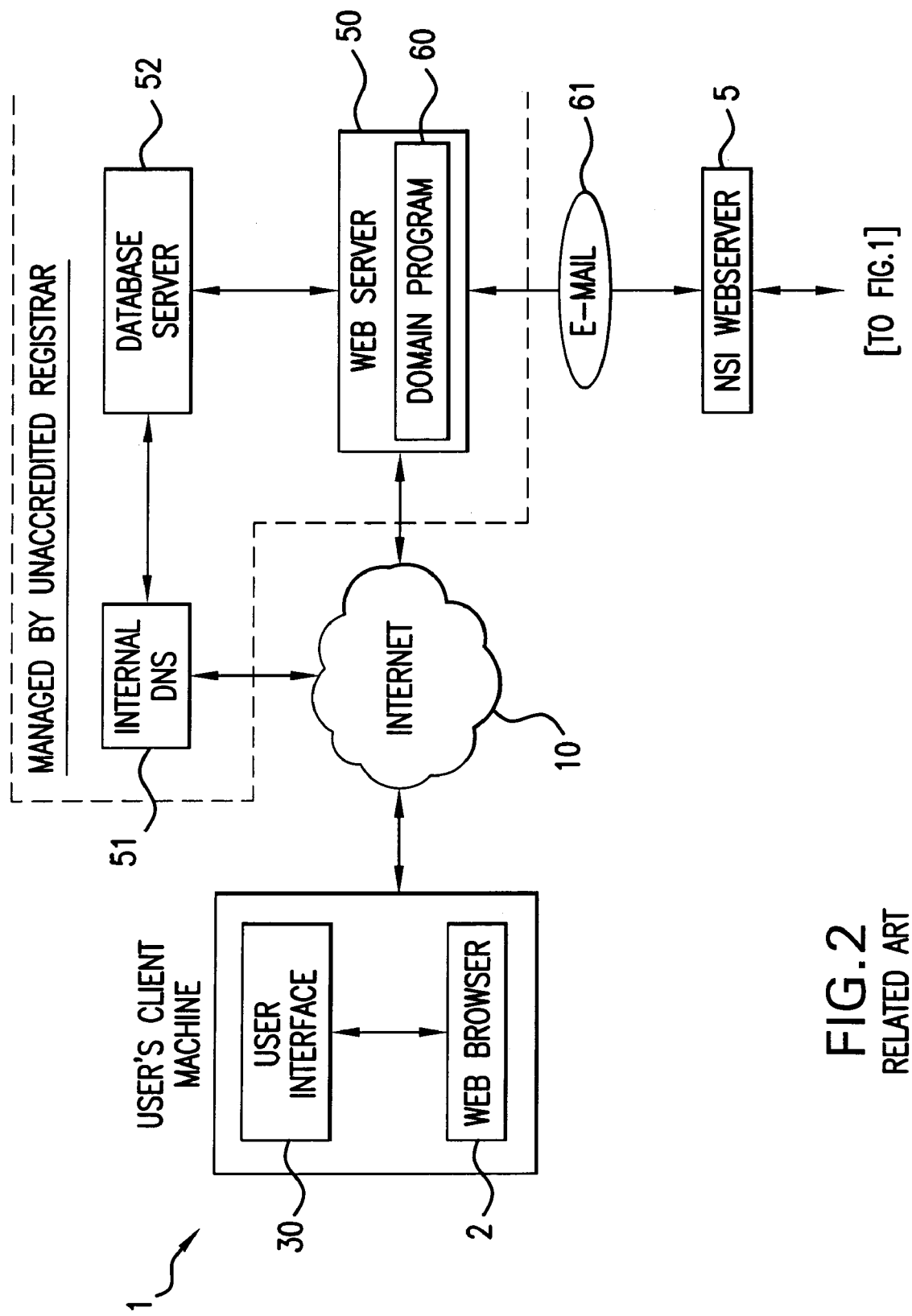
FIG. 2 is a block diagram showing a method of registering or modifying domain records through an unaccredited registrar under the related art.

The present invention relates to a method of registering and modifying domain names and associated records over a network, for example the Internet. An embodiment of the invention relates to a Registrant-modifiable domain name management system ("domain manager") that operates on a server connected to a client machine over a network, for example, the Internet. In one embodiment, the domain manager generates on the client machine an interface, for example a graphical user interface ("GUI"), that includes operation fields to allow the manipulation of certain data in a domain name database. A preferred user interface may present a plurality of views or screens to provide a linear, simplified domain name registration procedure. In addition, the domain manager enables a Registrant to view certain contents of the domain name database and to enter modifications to selected records from the client machine. In embodiments where the data in the server's database is managed by an accredited registrar, the database communicates data from the accredited registrar's server to a Root Server through the Shared Registration System ("SRS") over a secure network to assure that the data stored in the accredited registrar's database is consistent with the corresponding data in the Root Server. In certain embodiments, the database also communicates directly with the Registrar Whois.

In preferred embodiments, proposed modifications to a registered domain name are first checked using an error-checking program through an interface generated on a Registrant's client machine. Results of the error-checking program are viewable on the Registrant's client machine and, if the proposed modifications are determined to be error-free, the proposed modifications can be approved and transmitted to the registrar database and to the SRS. The change is stored in the registrar database and the record of the change is also stored in the database. The SRS later generates flat files to update the Domain Name System ("DNS") and to write to a Whois server, preferably one integrated with its own database. Typically, the SRS updates the DNS root server after a delay of for example 12–24 hours, although both shorter and longer delays might be practiced depending on network resources and other practical concerns.

The domain manager acts as a front end for a database that stores all domain name information and changes for the domain names for which that particular accredited registrar is authoritative. Administrative tools supported by the domain manager enable site administrators to track changes to domains within their jurisdiction. The domain manager preferably manages multiple domain names for a single account (Registrant) name and preferably enables Registrants to manage their own domain name zone and contact information via a system that allows global updates to all of the Registrant's domain names. The system changes the concept of the zone file from the Registrant's perspective by breaking down the components of the zone file into separate entities or sections, each of which can be modified through a wizard-driven process. A "wizard", as used herein, is a utility within an application that helps the Registrant use the application to perform a specific task. For instance, a domain manager in accordance with aspects of the invention might break down a zone file into separate sections for an IP address record and a domain alias record. A wizard guides a Registrant through a step-by-step process to change an IP address record and a completely different step-by-step process to change a domain alias. The wizard then facilitates global updates to the Registrant's authoritative domain name information.

The DNS recognizes the accredited registrar for a particular Registrant as having complete control over the domain names associated with that Registrant and so all changes to those domain names are preferably made through the accredited registrar of that name. Accredited registrars are able to edit zone information only for domain names that the particular accredited registrar has initially registered or that have been transferred by a Registrant to the accredited registrar. The administrative interface allows all aspects of the zone file to be changed by the Registrant operating through the accredited registrar.

In a preferred embodiment, the domain manager is linked to an internal DNS server that is the primary server for all host names that the domain manager registers. Further, the client interface (GUI) allows a Registrant to view all of the Registrant's domain names simultaneously. When using the system, a Registrant may select one name as the "active" domain name (the one being modified at that time) and may enter changes to a record associated with that domain name. The Registrant may then apply the changes made to that record globally to each domain name of that Registrant by sending an appropriate modification command to the internal DNS server. The server then communicates with the Shared Registration System, which updates the information associated with that domain name within the SRS database and later updates the Whois database, the DNS and the Root Servers. Preferred embodiments of a domain manager in accordance with the present invention segment the Registrant's domain records from the database in a way that allows the Registrant to make changes step-by-step in a wizard-driven or serially assisted method.

Figure 3:
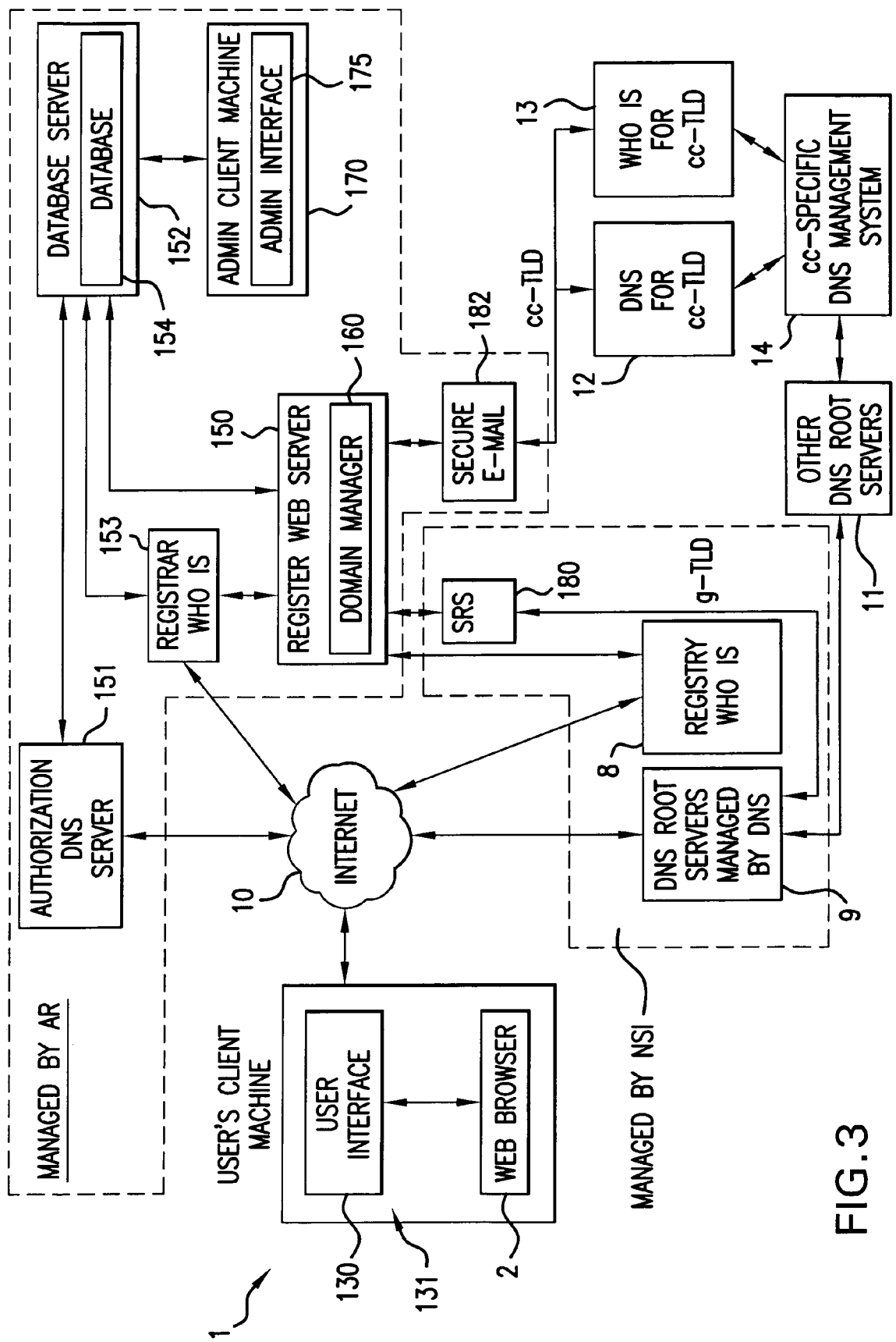
FIG. 3 is a block diagram of a preferred embodiment of the present invention showing a method of modifying domain records by a Registrant through an accredited registrar.

FIG. 3 shows an embodiment of the present invention for use by an accredited registrar ("AR") under the system presently defined by ICANN. The accredited registrar has access through its web server 150 and the Shared Registry System ("SRS") 180 to the DNS Root Server 9 that is the primary authoritative compilation of domain names and their associated addresses. While there remains an authoritative network comprising the Registry Whois database 8, the accredited registrar preferably manages its own Registrar Whois database 153, which is authoritative for all domain names registered through or transferred to that particular accredited registrar. Information initially registered in the Registrar Whois 153 is sent to the Registry Whois 8, which keeps a listing of host names and the accredited registrar for the host name and, when queried, directs queries to the proper authoritative Registrar Whois. The Registry Whois 8 is updated only if the accredited registrar is changed or if the DNS server with primary authority over the name is changed. As before, if a Registrant registers through an unaccredited registrar, that entity will act as a conduit for transfer of information between the Registrant and an accredited registrar.

A computer program product such as the domain manager program 160 running on the accredited registrar's web server 150 supports the interface 130 running on the Registrant's client machine 131 and an interface 175 running on an administrative client machine 170. Further, the registrar web server 150 interacts with a database server 152 that supports a database 154. Both the web server 150 and the data base server 152 are operationally associated with the Registrar Whois database 153. The database server also communicates with an authoritative DNS server 151 managed by the accredited registrar. The domain manager program is stored on a computer usable medium, for example a fixed drive or a CD-ROM or the like, and includes a computer-readable program.

As also shown in FIG. 3, new registrations and modifications to names defined at the country-code level proceed as described previously herein, except that the accredited registrar's web server 150 now communicates directly with the DNS (equivalent) for the country-code top-level domain name 12 for the given country code through a secure e-mail system 182.

Like any relational database, the DNS architecture is made up of tables, each containing a number of records. DNS database tables are called zone files, and are typically embodied as text files. After a zone file has been created, resource records for computers logically contained within the zone can be added. The DNS administrator has control over what records are contained in the zone file. The SOA (Start of Authority) record is at this time a required first entry in zone files. SOA records provide key information such as what name server is authoritative for a particular domain. Other records, such as A Records, CNAME, MX, are also added. The meanings of these records are explained more fully below. The records identify the location of resources. Zones overlay parts of the DNS hierarchical structure and determine where names are stored, in other words, which DNS server is the primary server for the name. A zone can contain records for a single domain, a portion of a domain, one or more sub-domains, or combinations of parent and child domains.

The illustrated domain manager 160 provides a front end for the database 154, which stores all domain information and domain changes. In other words, in this illustrated embodiment, the domain manager is the interface and engine for accessing and sharing Registrant records.

The administrative client machine 170 running the administrative interface 175 allows site administrators to track changes to domains within their jurisdiction. The domain manager is particularly advantageous in its ability to handle multiple domain names for a single Registrant. Most preferably the domain manager is capable of performing global updates and enables Registrants to manage their own domain name zone and contact information via an automated system of procedures stored in the database server.

Figure 4A:
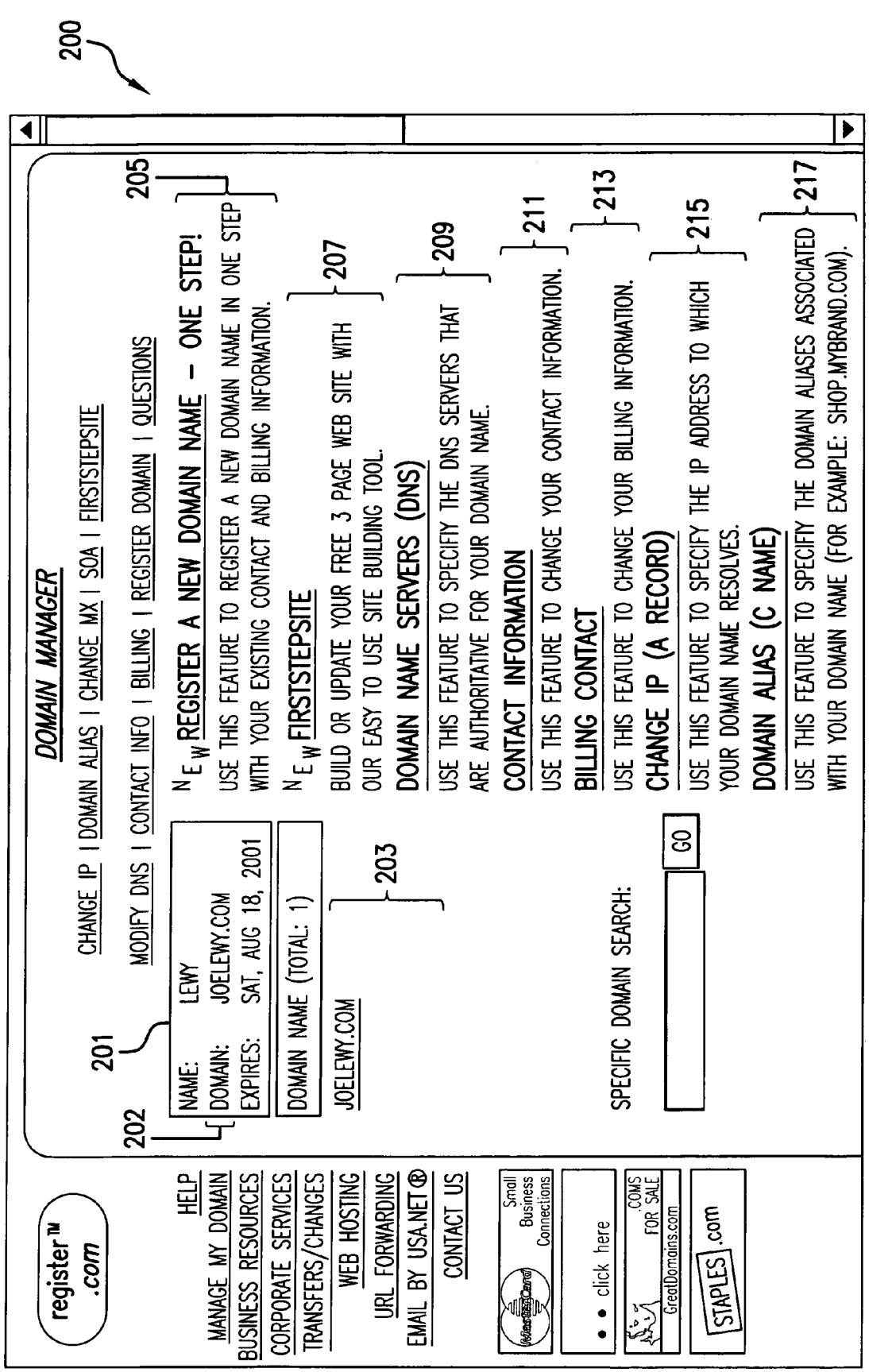
FIG. 4A is a .gif reproduction of a select function screen of an embodiment of the present invention. (Unpublished work. Copyright© 2000 Register.com).

The domain manager 160 breaks down the components of the zone into separate sections, each of which can be modified through a wizard-driven process. FIG. 4 shows several views of graphical user interfaces ("GUIs") that appear on the display in the course of this wizard-driven process. FIG. 4A shows a function select screen 200 generated by the illustrated embodiment of a domain manager. The upper left-hand side of the GUI preferably shows information specific to the Registrant, such as the Registrant's name 201, and the "active domain" 202, which is the domain the Registrant is currently reviewing for modification. Certain information might be displayed for the active domain name, such as the expiration date for the domain. Displayed along the left side of the GUI might be other domains 203 registered to that Registrant. Other information might be displayed, such as the expiration date for each domain (not shown). On the right side of the GUI are links to other portions of the domain manager, which allow the Registrant to select various domain management functions, such as initially registering a new domain name 205 or accessing a simplified website construction tool set 207. Other accessible functionality may include one that allows identification of the DNS servers authoritative for a domain name 209, a function for changing contact information 211, a function for changing billing information 213, one for changing or reviewing an IP address 215. Another function in some preferred implementations allows the change of a canonical name or alias 217. Each of the functions illustrated on the screen 200 of FIG. 4A is accessed in the conventional and typical manner used in modern graphical interfaces and so is not further discussed here.

Although it will be appreciated that a number of programming languages could be used to construct the Common Gateway Interface ("CGI") program that enables data entered into to fields of the GUI to interact with the database records, a preferred embodiment is a CGI program written in PERL or C. This code is a shell that accesses in most cases a database engine that coordinates and accomplishes much of the functionality of the domain manager.

Present embodiments of the domain manager application utilize an Oracle database solution. This is a particularly preferred database solution, although other solutions are presently known and other implementations of appropriate solutions are to be expected in the future. The database, as a whole, provides a great deal of information pertaining to the domain's zone information (i.e., Domain Name Servers, IP addresses, aliases, mail exchangers, etc.), as well as information pertaining specifically to the order which culminated in the domain name registration.

Most preferably, the Oracle database segments domain-specific information into well-normalized tables. These tables contain a complete historical record of domain registrations, modifications, and bills. For instance, by scanning particular tables in the database, one can glean information regarding the changes to IP address which have been initiated, as well as which user (either the Registrant or an agent acting on their behalf) performed the modification. Separately, one can determine changes to name servers, mail exchangers, and more.

The Domain Manager application interacts with the database through the use of PL/SQL stored functions and procedures. At no point is the application authorized to perform ANSI SQL statement requests on the database itself. This allows for a single transaction to occur through the concept of a function or procedure initiating each of the ANSI SQL statements. Additionally, there is the significant added benefit of security and reliability.

Referring now again to the interface illustrated in FIG. 4A, certain of the aspects of the interface design can be illustrated with reference to the functions and variables accessed in generating that interface. In some embodiments, the following functions or equivalents to such functions might appear in the template files for the function select screen GUI:
&GET_USER-NAME
&GET_DOMAIN NAME
&GET_ACTIVE_DOMAIN Variables that might be used in embodiments of the function select screen GUI include:
$User_Name
$active_Domain
@Domain_List
$Start_of_Authority or variations on these. Those of ordinary skill will appreciate that the implementation of interfaces such as that illustrated can be implemented in a variety of ways.

As can be seen from FIG. 4A, Registrants can, among other offered functions, modify the following information:
  (i) Address records 215, or "A records", which map host names to IP addresses.
  (ii) Canonical names records, or "CNAMES" 217. CNAMES create an alias, which is a name that points to or references another host.
  (iii) Contact Information 211, such as Zone, Organization, Administrative Contact, Billing and Technical Contact listed in Registrar Whois database.
  (iv) Account Information 213, such as mail exchange records, or "MX records", which provide information about where mail can be routed for members of the domain.

Figure 4B:
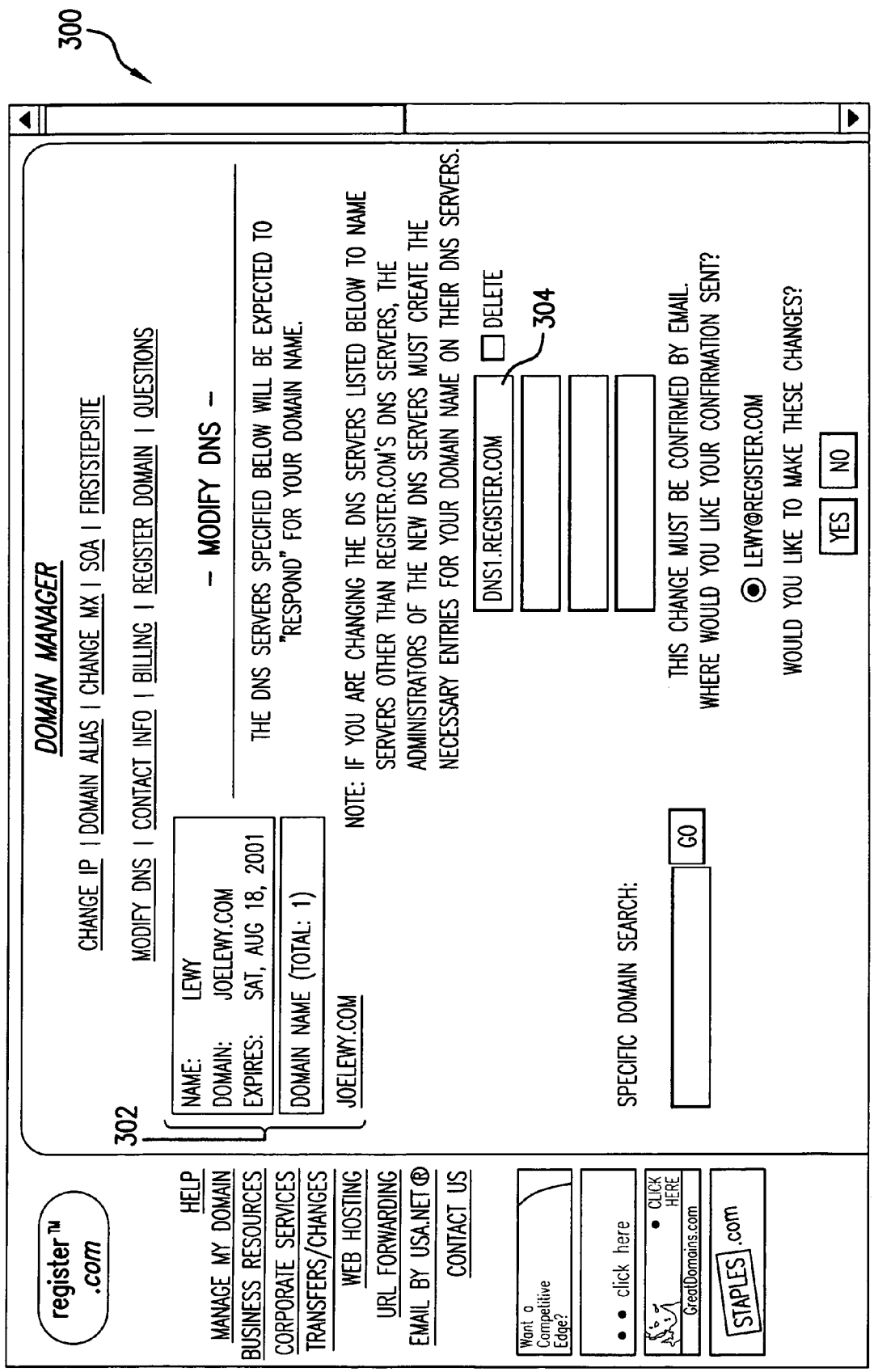
FIG. 4B is a .gif reproduction of a Modify DNS screen that might be provided in accordance with an embodiment of the present invention. (Unpublished work. Copyright© 2000 Register.com).

The Registrant may select a category of information to modify by clicking on one of the buttons 209, 211, 213 or 215. The appropriate record in the zone file is retrieved and a wizard takes the Registrant on a step-by-step process to change the category of information selected. For instance, if the Registrant selects "Domain Name Servers" 209, the Modify DNS screen 300 shown in FIG. 4B is accessed by the domain manager and displayed on the client computer. Note that the data for the illustrated screen might be stored on a centralized server used by the registrar or the data used for generating the Modify DNS screen could be stored locally on the client machine and accessed from there. The Modify DNS screen 300 is generated and shows the default information field 302 as well as the DNS information 304 appropriate to the presently active domain name. This screen allows the review of the information related to the authorized DNS server, the deletion of a DNS server's authorization, and the identification of a new authorized DNS server.

Another function that might be selected is the Change IP function 215, which causes a different graphical interface to appear (not shown). In a manner similar to the Modify DNS function discussed above, the Change IP function allows review of the present IP address associated with the domain name. The Registrant may review the current address for the active domain, and elect to change it by selecting the change functionality and clicking on the appropriate portion of the graphical interface. The Registrant is then taken to another view, the Change IP address action screen, where the Registrant can enter a new IP address in a field of the interface and click on a "yes" button to accept the change.

In a preferred embodiment, this and other action screens build in error checking to assure that a valid entry has been placed in the field. The error checking is performed when the Registrant attempts to submit changes and may be done either on the client machine or, more preferably, on an active server of the registrar. This location allows the registrar better control over the rule sets and facilitates more regular updates of the error detection rules. The error detection functionality can, for example check to see if an offered IP address is valid. For instance, the rules might indicate that the following IP addresses are to be assumed invalid: 0.X.Y.Z, 127.0.0.1, and any Class D address. Alternatively, the entered IP address might be parsed for illegal domain name characters and the Registrant alerted to the illegal characters and asked to correct the errors in a graphical interface generated for that purpose. Upon completing the field entries in the GUI and submitting modified records that most preferably pass the error checking procedure, the modifications are sent to the accredited registrar's web server and are updated in the database. New zone files are created containing the modified records.

The following functions might appear in an embodiment of both the address review screen and the address action screen:
&GET_NAME
&GET_DOMAIN_LIST
&GET_ACTIVE_DOMAIN
&GET_DOMAIN_IP_LIST The following variables might be used in generating and altering the information provided on such screens:
$User_Name
$Active_Domain
@Domain_List
%IP_List Note that in the above-described case, the Registrant has requested an address change for a single active domain. However, for contact information, the Registrant has the option to apply such a change globally. If chosen, the global change option modifies contact records for all domain names associated with the Registrant's account. The Registrant's account, as used herein, describes the particular system used by the registrar to identify various domain names as the property of a given Registrant.

To change a canonical name, the Registrant may select the Change Domain Alias screens (not shown), which is similar in function to the Change IP screens. Registrants have the opportunity to create aliases to their own domains or their own IP addresses within the domain manager. For example, Registrants could use the domain manager or its functionality to select the following entries, without limitation, for a domain:

| | |
|---|---|
| Suppose two-four.com has the IP address 216.59.97.49 | [Not an alias] |
| www.two-four.com can point to two-four.com | [Alias] |
| oldwww.two-four.com has the IP address 216.32.192.142 | [Not an alias] |
| oldftp.two-four.com can point to oldwww.two-four.com | [Alias] |

Registrants can add new aliases, or delete or edit existing aliases. In the preferred embodiment, there are three screens (not shown) associated with Change Alias. First, the preview screen shows the Registrant's current aliases associated with the domain. Next, the add screen presents a field that enables the Registrant to add an alias to the Registrant's domain. The Registrant can specify which IP address the domain alias corresponds to, so that in the above example, "oldftp.two-four.com", can point to the same IP address as "oldwww.two-four.com". Third, Registrants have the ability to delete domain aliases. For instance, in the above example, if the Registrant wanted to remove access to the site via "oldftp.two-four.com", the delete screen informs the Registrant as to where the alias currently "points" and then presents a field that enables the Registrant to select whether the alias should be deleted. Again, the data validity is error-checked at the time the form is submitted. In the preferred embodiment, aliases are prohibited to terminate in dots (periods), and must be legal sub-domain names.

The following functions might appear in embodiments of the three domain manager Change Alias screens:
&GET_NAME
&GET_DOMAIN_LIST
&GET_ACTIVE_DOMAIN
&GET_CNAME_LIST The following variables might be used in the Change Alias screens:
$User_Name
$Current_Domain
@Domain_List
% Aliases Referring now to FIG. 5, the Contact Info screen 400 is shown. As with all other screens, the Registrant is presented with current information for the active domain. The Registrant may select from various fields of contact information that might be reviewed or altered, as illustrated in the screen. Selection of any of these fields causes a field to appear displaying current contact information and asking if the Registrant if the information should be changed. If the Registrant selects the "yes" field, an active screen (not shown) enables Registrants to modify contact data and enter the modification in the accredited registrar's database. Again, an error-check is performed upon form submission. For instance, telephone numbers are scanned for any characters other than digits, spaces, periods, dashes, parentheses, and plusses.

Figure 7:
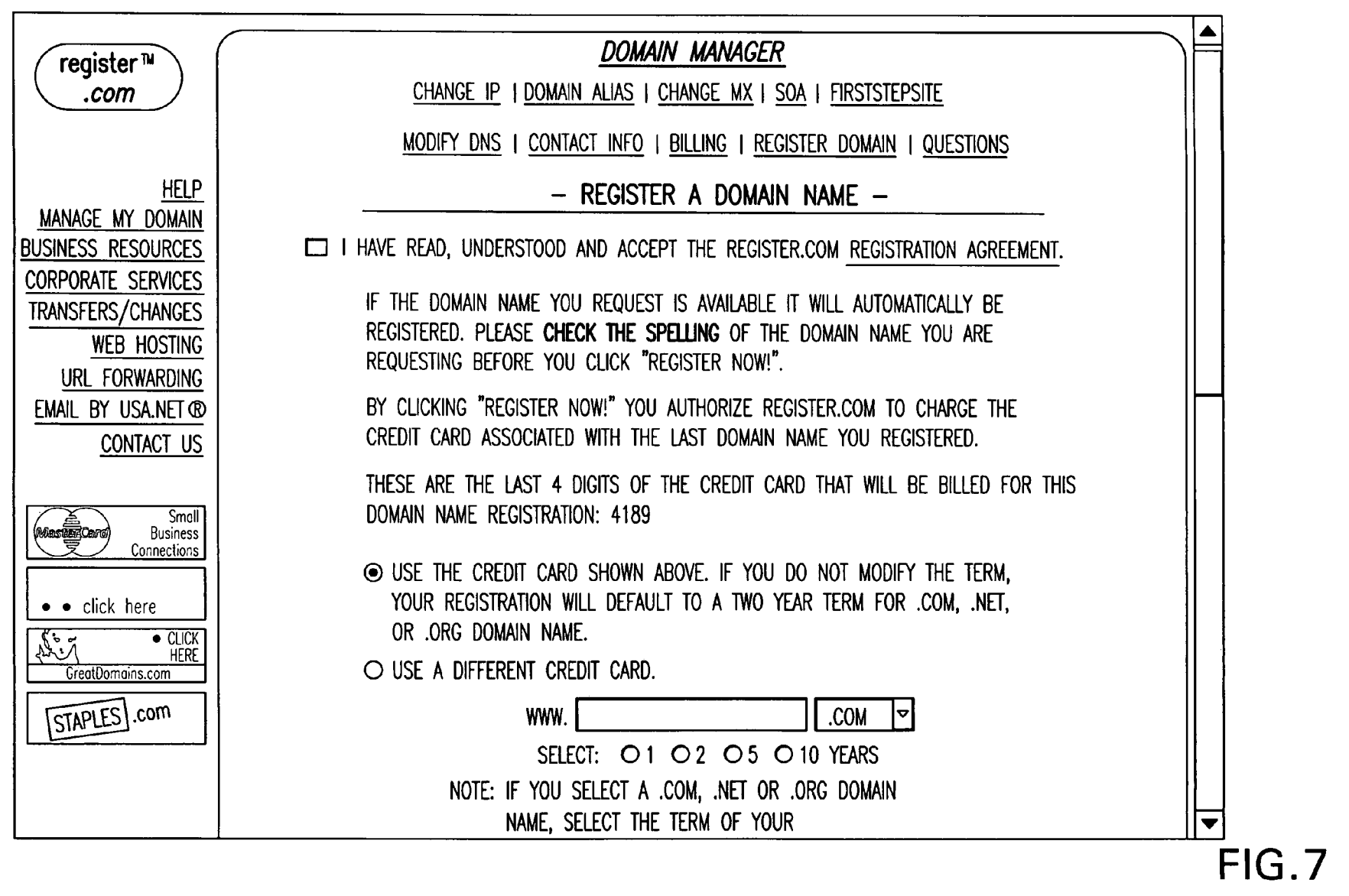

Preferred embodiments of the invention might use functions such as the following in cooperation with the Contact Information pages:
&GET_CONTACT
&GET_USER
&GET_ACTIVE_DOMAIN
&GET_DOMAIN_LIST Appropriate variables for use with the Contact Information pages might include the following:
$Org, $First, $Last, $Phone, $Fax, $Addr, $City, $State, $Zip, $Country, $Email
$User_Name
$Current_Domain
@Domain_List Various other screens might also be accessed as a part of a Registrant's use of embodiments of the domain manager. For example, FIG. 6 shows a help screen that offers advice on how to accomplish various domain management tasks as well as explanations of certain of the domain manager tasks. Of course, one of the most fundamental aspects of the domain manager is the domain name registration process, which commences with the Register a Domain Name screen, shown in FIG. 7.

The DNS recognizes the accredited registrar for a particular Registrant as controlling the domain names associated with that Registrant. Most preferably the domain manager system or the overall DNS expects that all changes to those domain names are made by the Registrant through the accredited registrar of those names. Accredited registrars are able to edit zone information only for domains that the particular accredited registrar has initially registered or that have been transferred by a Registrant to the accredited registrar. The administrative interface allows all aspects of the zone file to be changed by the Registrant operating through the accredited registrar.

Accredited registrars can modify all records that a Registrant can modify, and in addition, can modify the following records:

Primary and secondary DNS
DNS Mail
Serial Number
Refresh Time, which tells a secondary DNS how often to attempt to perform a zone refresh.
Retry Interval, which specifies how soon the secondary DNS will attempt a refresh after one has failed.
Expire Time, which determines how long the secondary DNS will continue to provide authoritative answers when a refresh fails.
Time to Live specifies how long a particular answer will be valid. When a client queries the DNS server, it takes the TTL information along with the response so it will know how long it can cache, or use, the answer without having to check back again for changes.

The domain manager is supported by a database 154 (indicated in FIG. 3) that controls all data in the DNS zone directory, as well as information in named.conf., the confirm file of names in a DNS. Domain manager is supported by a set of stored procedures and triggers that insure the database and text files are in sync.

Selected data relationships can be summarized as follows:

```
1 Registrant and 1 ISP > Many domain names
1 domain name > Many profiles
1 domain name > One zone file
1 Zone file > Many A records
1 Zone file > Many C records
1 Zone file > Many MX records
1 Zone file > One SOA (TTL, Serial Number, DNS, etc.)
```

This database structure shows the zone segmentation that allows Registrants working through an accredited registrar to manage all the records of all the domain names associated with that Registrant's account name and perform global updates. The structure might also allow ISP authorized representatives to manage domain records. Upon completing a form and submitting changes, domain manager updates the changes in the database and creates a new zone file.

In another alternative embodiment, the invention may be implemented as a computer program product for use with a computer system. Such an implementation may include a series of computer instructions fixed either on a tangible medium, such as a computer readable media (e.g. diskette, CD-ROM, ROM or fixed disk, or transmittable to a computer system via a modem or other interface device connected to a network such as the Internet. The network medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over a network (e.g., the Internet).

Each of the graphical interfaces, screens or GUIs may be constructed by conventional software programming techniques known in the art, such as visual builders. The underlying database application program product performs all database functions, such as storing information, searching through records, accessing records, and modifying records. A preferred database application program includes stored procedures. The program allowing the user to modify entries in fields on the GUI is a utility program or a wizard. A preferred CGI program mediates the interaction between the data entered into the fields of the GUI and the records in the database. The underlying shared access application program, for example the Shared Registration System application program, performs all DNS root server functions such as storing information, searching through records, accessing records and modifying records. Information is transmitted from the registrar to the SRS and then later the SRS generates flat files including the domain name information changes input through the database application program cause the SRS to be updated.

Although the present invention has been described in detail with reference only to the presently preferred embodiments, those of ordinary skill will appreciate that various modifications can be made without departing from the invention. Accordingly, the invention is defined by the following claims.

What is claimed is:

1. A method of administering domain name records from a client computer, the method comprising:

displaying on a client computer a domain management function select screen listing a plurality of domain names and listing a plurality of user selectable domain management functions;

selecting from the plurality of domain names an active domain name;

selecting from the plurality of user selectable domain management functions a first domain management function;

entering information through the first domain management function corresponding to a first record for the active domain name stored in a domain name database and causing the first record to be replaced with a modified first record in the domain name database according to the first domain management function; and causing a record in a DNS root server to be in agreement with the modified first record.

2. The method of claim 1, further comprising applying the modification of the first record to a second record corresponding to a second domain name;

storing the modified second record in the domain name database; and causing a third record in the DNS root server to be in agreement with the modified second record.

3. The method of claim 2, further comprising error checking the modified first record for the first domain name and the modified second record for the second domain name prior to storing the records in the domain name database.

4. The method according to claim 3, wherein the first record is an IP address.

5. The method according to claim 3, wherein the first record is a domain name.

6. The method according to claim 3, wherein the first record is a canonical name.

7. The method according to claim 3, wherein the first record is a mail exchange record.

8. The method according to claim 3, wherein the first record is a contact record.

9. The method according to claim 8, wherein the contact record is selected from a group consisting of zone, organization, administrative, billing and technical.

10. The method according to claim 2, wherein the first record is selected from a group consisting of primary DNS, secondary DNS, DNS mail, refresh time, retry interval, expire time and time-to-live.

11. The method according to claim 1, wherein the first record is associated with an account name and the selecting an active domain name requires input of the account name.

12. The method of claim 1, wherein the plurality of user selectable domain management functions includes: changing a domain name server associated with the active domain and changing an IP address associated with the active domain; changing a canonical name corresponding to the active domain; and changing mail exchange records corresponding to the active domain.

13. The method of claim 1, wherein the plurality of user selectable domain management functions includes modifying contact information associated with the active domain.

* * * * *